US012801167B2

(12) United States Patent
Qian et al.

(10) Patent No.: US 12,801,167 B2
(45) Date of Patent: Nov. 17, 2026

(54) ULTRA-HIGH PRECISION PNEUMATIC FORCE SERVO SYSTEM AND INTELLIGENT CONTROL PARAMETER OPTIMIZATION METHOD THEREFOR

(71) Applicants: ZHEJIANG LINIX MOTOR CO., LTD., Dongyang (CN); JIANGSU UNIVERSITY, Zhenjiang (CN)

(72) Inventors: Pengfei Qian, Zhenjiang (CN); Chenwei Pu, Zhenjiang (CN); Shan Du, Dongyang (CN); Xiaofeng Wu, Dongyang (CN); Xiaoding Ruan, Dongyang (CN); Yang Fu, Hangzhou (CN); Lei Liu, Zhenjiang (CN); Yifan Jia, Zhenjiang (CN); Hui Luo, Zhenjiang (CN); Kaiyu Dai, Zhenjiang (CN); Bing Zhang, Zhenjiang (CN)

(73) Assignees: ZHEJIANG LINIX MOTOR CO., LTD., Dongyang (CN); JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/847,258

(22) PCT Filed: Dec. 21, 2023

(86) PCT No.: PCT/CN2023/140663
§ 371 (c)(1),
(2) Date: Sep. 15, 2024

(87) PCT Pub. No.: WO2024/114826
PCT Pub. Date: Jun. 6, 2024

(65) Prior Publication Data

US 2025/0198430 A1 Jun. 19, 2025

(30) Foreign Application Priority Data

Aug. 8, 2023 (CN) ........................ 202310998837.9

(51) Int. Cl.
*G05D 16/20* (2006.01)
*F15B 21/08* (2006.01)
(Continued)

(52) U.S. Cl.
CPC ....... *G05D 16/2026* (2013.01); *F15B 21/087* (2013.01); *G05B 13/0275* (2013.01);
(Continued)

(58) Field of Classification Search
CPC . G05D 16/2026; G05B 13/0275; F15B 11/06; F15B 21/087; F15B 2211/328;
(Continued)

(56) References Cited

U.S. PATENT DOCUMENTS 5,450,999 A * 9/1995 Scholten .................. F24F 11/33 236/78 D
5,726,877 A * 3/1998 Antoszkiewicz .. G05B 13/0275 318/609
(Continued)

FOREIGN PATENT DOCUMENTS

CN 106547952 3/2017
CN 107830008 3/2018
(Continued)

*Primary Examiner* — Dustin T Nguyen
(74) *Attorney, Agent, or Firm* — Jiwen Chen; Joywin IP Law PLLC

(57) ABSTRACT

The present invention provides an ultra-high precision pneumatic force servo system and an intelligent control parameter optimization method therefor. The pneumatic force servo system is mainly composed of a double-acting air-floating frictionless cylinder and a pressure control system; the effect of friction on the control accuracy can be removed by using the air-floating frictionless cylinder; the pressure control system achieves ultra-high precision control of pressure by means of a fuzzy PI controller optimized on the basis of a novel improved particle swarm algorithm; a Gaussian
(Continued)

variation strategy and a fuzzy control theory are integrated in the novel improved particle swarm algorithm; optimized fuzzy PI control parameters are obtained using the novel improved particle swarm algorithm and ultra-high precision pressure control of a chamber of the air-floating frictionless cylinder is performed on the basis of the parameters, such that ultra-high precision force output of the system can be achieved; the pneumatic servo system provided by the present invention can be applied to occasions where high control accuracy of force is required, expanding the application range of the pneumatic servo system.

10 Claims, 4 Drawing Sheets

(51) Int. Cl.
*G05B 13/02* (2006.01)
*F15B 11/06* (2006.01)

(52) U.S. Cl.
CPC ......... *F15B 11/06* (2013.01); *F15B 2211/328* (2013.01); *F15B 2211/6313* (2013.01); *F15B 2211/6656* (2013.01); *F15B 2211/8855* (2013.01)

(58) Field of Classification Search
CPC ...... F15B 2211/6313; F15B 2211/8855; F15B 2211/6656
See application file for complete search history.

(56) References Cited

U.S. PATENT DOCUMENTS

| | | | | | |
|---|---|---|---|---|---|
| 5,910,175 | A * | 6/1999 | Malson | F16H 61/061 701/84 |
| 6,041,320 | A * | 3/2000 | Qin | G05B 13/0275 706/1 |
| 6,705,199 | B2 * | 3/2004 | Liao | F15B 9/09 91/363 R |
| 6,799,501 | B2 * | 10/2004 | Yo | F15B 11/046 91/361 |
| 7,021,191 | B2 * | 4/2006 | Moler | F15B 11/048 91/393 |
| 7,210,394 | B2 * | 5/2007 | Yajima | F15B 11/044 60/368 |
| 8,146,481 | B2 * | 4/2012 | Hoshino | F15B 21/08 60/459 |
| 10,883,523 | B2 * | 1/2021 | Takakuwa | F15B 11/064 |
| 11,118,606 | B2 * | 9/2021 | Harimoto | F15B 11/044 |
| 11,370,035 | B2 * | 6/2022 | Yajima | B23B 31/16216 |

FOREIGN PATENT DOCUMENTS

| | | | | |
|---|---|---|---|---|
| CN | 115268268 | | 11/2022 | |
| CN | 116482981 | | 7/2023 | |
| DE | 4431341 | * | 3/1996 | F15B 21/087 |

* cited by examiner

ULTRA-HIGH PRECISION PNEUMATIC FORCE SERVO SYSTEM AND INTELLIGENT CONTROL PARAMETER OPTIMIZATION METHOD THEREFOR

This is a U.S. national stage application of PCT Application No. PCT/CN2023/140663 under 35 U.S.C. 371, filed Nov. 28, 2023 in Chinese, claiming priority of Chinese Application No. 202310998837.9, filed Aug. 8, 2023, all of which are hereby incorporated by reference.

TECHNICAL FIELD

The present invention belongs to the technical field of pneumatics, and in particular relates to an ultra-high precision pneumatic force servo system and an intelligent control parameter optimization method therefor.

BACKGROUND TECHNOLOGY

With the development of technology, force servo systems have been widely used in the industrial field. Currently, high-precision force servo systems generally use an electric cylinder as an actuator. In a pneumatic force servo system, the control accuracy of pneumatic output force is not high due to complex friction generated by a common cylinder during movement. In order to solve this problem, the prior art such as documents "Study on Non-Friction Cylinder and High Precision Pneumatic Load System" and "Research on Key Technologies of Pneumatic Suspension System for Zero-Gravity Environment Simulation", and patent CN 113700696 B disclose novel air-floating frictionless cylinders having different structures. Such cylinders have the characteristic of extremely low friction, and can theoretically achieve high-precision pneumatic output force control. However, these cylinders are all single-acting cylinders, and can only achieve force output in a single direction. The present invention intends to use the double-acting air-floating frictionless cylinder disclosed in the Chinese patent with application No. 201711223571.1 as an actuator of a pneumatic force servo system. Because of the independent air supply working manner of the cylinder, a frictionless state is not affected in a reversing process of the cylinder, allowing for alternating output of a high precision pushing force and a high precision pulling force. Given the use of an air-floating frictionless cylinder, the output force of the cylinder can be equivalent to the pressure in a cylinder chamber to be controlled.

Fuzzy PI control has the advantages such as simple algorithm, high efficiency of control and good robustness, and thus the present invention intends to use a fuzzy PI control algorithm to achieve high-precision control of pressure. However, in practical use, a trial-and-error method is often used to select parameters of a fuzzy PI controller, which results in great randomness in selection, and thus it is difficult to select more precise parameters, such that the control accuracy is not high. At present, simple manual random parameter tuning cannot meet the requirements for high precision control or even ultra-high precision control, and the rapid development of swarm intelligence algorithms provides an intelligent method for complex parameter tuning, that is, a set of optimal parameters are found by means of multiple iterations, thereby obtaining a satisfactory control effect as much as possible. Ant colony algorithm, genetic algorithm, and particle swarm algorithm are relatively common swarm intelligence algorithms. Among them, the particle swarm algorithm has the advantages such as simple implementation and few tuning parameters, and is thus widely applied in the field of optimization, and can solve the parameter selection problem of a fuzzy PI controller. However, the traditional particle swarm algorithm has the problems of being unable to effectively balance global search and local search, and being unable to effectively jump out when particles fall into local optima, which seriously affects the optimization efficiency and accuracy.

Therefore, how to provide an ultra-high precision pneumatic force servo system and an intelligent control parameter optimization method therefor is a problem to be solved urgently by a person skilled in the art.

SUMMARY OF THE INVENTION

The object of the present invention is to break the conventional view that a pneumatic actuating system cannot achieve ultra-high precision pneumatic output force control. To this end, the present invention provides an ultra-high precision pneumatic force servo system and an intelligent control parameter optimization method therefor.

In order to achieve the object above, the present invention adopts the following technical solutions:

an ultra-high precision pneumatic force servo system, comprising an actuator module, a pressure control module, an air source module, and an air supply module; the actuator module is a double-acting air-floating frictionless cylinder; the pressure control module comprises an industrial personal computer, a data acquisition card, a three-position five-way solenoid valve, a two-position three-way solenoid valve I, a two-position three-way solenoid valve II, a high-precision pressure sensor I, a high-precision pressure sensor II, a small air tank I, and a small air tank II; the air supply module comprises a pressure relief valve I, a pressure relief valve II, a small air tank III, a small air tank IV, an air dryer, and a precision filter; the air source module comprises an air source, a pressure relief valve III, and a large air tank;

the compressed air generated by the air source is delivered to the large air tank by means of the action of the pressure relief valve III, so as to provide compressed air for each pneumatic branch; the pressure relief valve I, the small air tank III, the air dryer, and the precision filter constitute a branch I for supplying air to an air bearing of the air-floating frictionless cylinder, and the pressure relief valve II and the small air tank IV constitute a branch II for supplying air to an air-floating piston of the air-floating frictionless cylinder, thereby causing the air-floating frictionless cylinder to work normally;

the upstream end of the three-position five-way solenoid valve is connected to the large air tank as a branch III; two ports of the three-position five-way solenoid valve are connected to the small air tank I and the small air tank II, respectively, by means of the two-position three-way solenoid valve I and the two-position three-way solenoid valve II; the small air tank I and a rodless chamber of the air-floating frictionless cylinder form a controlled chamber I, and the small air tank II and a rod chamber of the air-floating frictionless cylinder form a controlled chamber II; the high-precision pressure sensor I and the high-precision pressure sensor II feedback pressure information of the chamber I and pressure information of the chamber II, respectively, to the industrial personal computer by means of the data acquisition card, and the industrial personal computer executes respective fuzzy PI control algorithms and then outputs voltage signals to the three-position five-way solenoid valve by means of the data acquisition card.

Further, the maximum valve port opening of the two-position three-way solenoid valve I and the two-position three-way solenoid valve II is larger than or equal to the maximum valve port opening of the three-position five-way solenoid valve.

Further, the inner diameters of all air pipes between the three-position five-way solenoid valve and the chamber of the air-floating frictionless cylinder are greater than the nominal diameters of the two-position three-way solenoid valve I, the two-position three-way solenoid valve II, and the three-position five-way solenoid valve.

An intelligent control parameter optimization method for the ultra-high precision pneumatic force servo system, wherein the small air tank I and the rodless chamber of the air-floating frictionless cylinder form the controlled chamber I, the small air tank II and the rod chamber of the air-floating frictionless cylinder form the controlled chamber II, the high-precision pressure sensor I and the high-precision pressure sensor II feedback pressure information of the chamber I and pressure information of the chamber II, respectively, to the industrial personal computer by means of the data acquisition card, the industrial personal computer executes respective fuzzy PI control algorithms and then outputs voltage signals to the three-position five-way solenoid valve by means of the data acquisition card, and wherein control parameters of the fuzzy PI control algorithms are optimized by a novel improved particle swarm algorithm, and the steps are as follows:

S1: building a fuzzy PI pressure controller, and determining variables to be optimized;

S2: determining, by means of a trial-and-error method, search space of the variables to be optimized;

S3: determining an objective function in an optimization process;

S4: performing iterative optimization using the novel improved particle swarm algorithm; and

S5: taking the chamber I and the chamber II as controlled objects, and performing optimization to obtain respective optimized fuzzy PI control parameters.

Further, in step S3, the objective function is selected as follows: in a system step response rising stage, the stage being set to be the first $T_1$ seconds, an ITAE evaluation index function is used; when the system enters a steady state stage, the stage being set to be $T_1$ to $T_2$ seconds, an ITSE evaluation index function is used; the specific expression is:

$$f=\begin{cases}\int_0^{T_1} t|e(t)|dt & 0\le t\le T_1\\ \int_{T_1}^{T_2} te^2(t)dt & T_1<t\le T_2\end{cases}$$

where: $f$ is an objective function; t is time; and e is a pressure control error.

Further, the method further comprises: integrating a penalty function into the objective function, specifically as follows: when a certain particle does not complete a system step response rising stage in $T_1$ seconds, stopping the present control and sentencing the particle to "death", i.e. giving an extremely poor fitness value to the particle; when the input voltage of the three-position five-way solenoid valve reaches 0V or 10V three times, determining that the system oscillates at this time, and stopping the present control and sentencing the particle to "death".

Further, the iterative optimization process in step S4 is as follows:

S41: setting basic parameters of the novel improved particle swarm optimization algorithm and initializing same;

S42: randomly initializing particle position and velocity vectors in the search space;

S43: calculating a fitness value of each particle;

S44: comparing the fitness values to obtain individual history optimal particle positions and a global optimal particle position;

S45: updating the particles using a velocity update formula and a novel position update formula;

S46: checking each particle to determine whether there is a particle having gone beyond border, and if there is a particle having gone beyond border, retaining the state of the particle before updating;

S47: if the number of iterations reaches the maximum number of iterations, executing the next step; otherwise, executing step S43; and

S48: ending operation and outputting optimized fuzzy PI control parameters.

The velocity update formula and the novel position update formula in step S45 are as follows:

$$\vec{V}_i(t+1)=w\vec{V}_i(t)+c_1r_1\left(\vec{X}_{pbi}(t)-\vec{X}_i(t)\right)+c_2r_2\left(\vec{X}_{gb}(t)-\vec{X}_i(t)\right)$$

$$\vec{X}_i(t+1)=\begin{cases}\vec{X}_i(t)+\vec{V}_i(t+1), & & r_3>\beta\ (a)\\ \vec{X}_i(t)+u\left(\vec{X}_{gb}(t)-\vec{X}_i(t)\right), & \lambda_{imax}(t)>r_a\ (I) & \multirow{2}{*}{$\left.\right\}\ r_3\le\beta\ (b)$}\\ v\vec{X}_i(t), & \lambda_{imax}(t)\le r_a\ (II) & \end{cases}$$

where: $\vec{X}_i(t)$ is the position of an i-th particle after t iterations; $\vec{X}_{pbi}(t)$ is the individual history optimal position of the i-th particle after t iterations; $\vec{X}_{gb}(t)$ is the global optimal position of the whole swarm after t iterations; $\vec{V}_i(t)$ is the velocity of the i-th particle after t iterations; $\vec{V}_i(t+1)$ is the velocity of the i-th particle after (t+1) iterations; w is an inertia weight; $c_1$ and $c_2$ are a personal learning factor and a social learning factor, respectively; $r_1$, $r_2$, $r_3$, and $r_\alpha$ are random numbers within the range of [0, 1]; β is a coefficient of determination, and is determined by the standard deviation of the individual history optimal fitness values, and when the standard deviation is greater than 1, the value of β is 0.1; otherwise, the value of β is 0.5; v and u are random numbers conforming to Gaussian distribution; $\lambda_{imax}(t)$ is the weight of the maximum difference between $\vec{X}_i(t)$ and $\vec{X}_{gb}(t)$ in all dimensions, and the specific expression is as follows:

$$\begin{cases}\lambda_{ik}(t)=\left|\frac{x_{ik}(t)-x_{gbk}(t)}{x_{gbk}(t)}\right|\\ \lambda_{max}(t)=\max\{\lambda_{i1}(t),\lambda_{i2}(t),\ldots,\lambda_{ik}(t),\ldots,\lambda_{in}(t)\}\end{cases}$$

where: $x_{ik}(t)$ is the k-th dimension position value of the i-th particle at a t-th iteration; $x_{gbk}(t)$ is the k-th dimension value of the global optimal position at the t-th iteration; $\lambda_{ik}(t)$ is the k-th dimensional difference weight of the i-th particle at the t-th iteration;

the formula of random numbers u and v conforming to Gaussian distribution introduced in the improved particle swarm update formula is:

$$\begin{cases} u \sim N(1, \sigma_u^2) \\ v \sim N(r_4, \sigma_v^2), \sigma_v = r_5 \end{cases}$$

where: $r_4$ is a random number within the range of [−1.5, 1.5]; $r_5$ is a random number within the range of [0, 1]; $\sigma_u$ and $\sigma_v$ respectively are the variances of the Gaussian distributions that u and v conform to.

Further, parameters w, $c_1$, $c_2$, and $\sigma_u$ in the novel position update formula are self-adaptive by means of a fuzzy control system, specifically as follows: the number of iterations t and the maximum difference weight $\lambda_{imax}(t)$ are taken to be input variables, multiplied by corresponding quantization factors $Q_t$ and $Q_\lambda$ and then inputted into a fuzzy system, and are fuzzified and then multiplied by proportion factors $P_w$, $P_{c1}$, $P_{c2}$, and $P_{\sigma u}$, and then increments $\Delta w$, $\Delta c_1$, $\Delta c_2$, and $\Delta\sigma_u$ are outputted, and the parameters w, $c_1$, $c_2$, and $\sigma_u$ can be obtained by means of the following formula:

$$\begin{cases} w = w_0 + \Delta w \\ c_1 = c_{10} + \Delta c_1 \\ c_2 = c_{20} + \Delta c_2 \\ \sigma_u = \sigma_{u0} + \Delta\sigma_u \end{cases}$$

where $w_0$, $c_{10}$, $c_{20}$, and $\sigma_{u0}$ are initial values of the parameters.

The domains of variables t, $\lambda_{imax}(t)$, $\Delta w$, $\Delta c_1$, $\Delta c_2$, and $\Delta\sigma_u$ are all set to be [0, 6], and quantization factors $Q_t$ and $Q_\lambda$ and proportion factors $P_w$, $P_{c1}$, $P_{c2}$, and $P_{\sigma u}$ are set to be $6/t_{max}$, 6*rand, where rand is a random number within the range of [0,1], (1/6)*rand, 1/3, 1/3, and 1/(6*rand) respectively, and initial values $w_0$, $c_{10}$, and $c_{20}$ are set to be 0.3, 0.5, and 0.5 respectively; if $t/t_{max}$<rand, the value of $\sigma_{u0}$ is $\cos(\pi t/t_{max})$, where $t_{max}$ is the maximum number of iteration; and if $t/t_{max}$≥rand, the value of $\sigma_{u0}$ is 1E-15.

Further, by performing ultra-high precision pressure control of the chamber I using the fuzzy PI control parameters of the chamber I system obtained by optimization based on the novel improved particle swarm algorithm, ultra-high precision pushing force output of the air-floating frictionless cylinder can be achieved; and by performing ultra-high precision pressure control of the chamber II using the fuzzy PI control parameters of the chamber II system obtained by optimization based on the novel improved particle swarm algorithm, ultra-high precision pulling force output of the air-floating frictionless cylinder can be achieved.

Further, by performing ultra-high precision pressure control of the chamber I and ultra-high precision pressure control of the chamber II alternately using the fuzzy PI control parameters of the chamber I system and the fuzzy PI control parameters of the chamber II system obtained by optimization based on the novel improved particle swarm algorithm, alternating output of an ultra-high precision pushing force and an ultra-high precision pulling force of the air-floating frictionless cylinder can be achieved.

The ultra-high precision pneumatic force servo system and the intelligent control parameter optimization method therefor proposed in the present invention have the following beneficial effects compared with the prior art:

1. The pneumatic actuator used in the present invention is a novel air-floating frictionless cylinder with independent air supply, and the cylinder avoids the effect of friction on the force servo control accuracy compared with an ordinary cylinder; in addition, because of the independent air supply working manner of the cylinder, a frictionless state is not affected in a reversing process of the cylinder, and compared with the existing single-acting air-floating frictionless cylinders, the cylinder can achieve alternating output of a pushing force and a pulling force.

2. The present invention proposes a novel improved particle swarm algorithm, which remedies the defects of traditional particle swarm algorithm being unable to effectively balance exploration capability and exploitation capability and being unable to effectively jump out local optima; in addition, the present invention achieves fuzzy PI pressure controller parameter optimization of a pneumatic force servo system using this algorithm, and this can avoid the problem of not high control accuracy due to the randomness and subjectivity of parameter tuning by means of a trial-and-error method, thereby finally achieving the ultra-high precision force control of an air-floating frictionless cylinder.

3. In the present invention, in fuzzy PI pressure control parameter optimization based on the novel improved particle swarm algorithm, corresponding penalty mechanisms are established for a particle with poor control accuracy and for a particle generating oscillation, respectively. In this way, experiment optimization time can be effectively reduced, and the operation can be stopped in time when the system oscillates, thereby prolonging the service life of an experimental device.

DETAILED DESCRIPTION OF THE DRAWINGS

The technical solutions in the embodiments of the present invention will be clearly and completely described with reference to the accompanying drawings in the embodiments of the present invention. Apparently, the described embodiments are only some rather than all of the embodiments of the present invention. All the other embodiments obtained by a person skilled in the art on the basis of the embodiments of the present invention and without inventive effort shall belong to the scope of protection of the present invention.

Embodiment I

Figure 1:
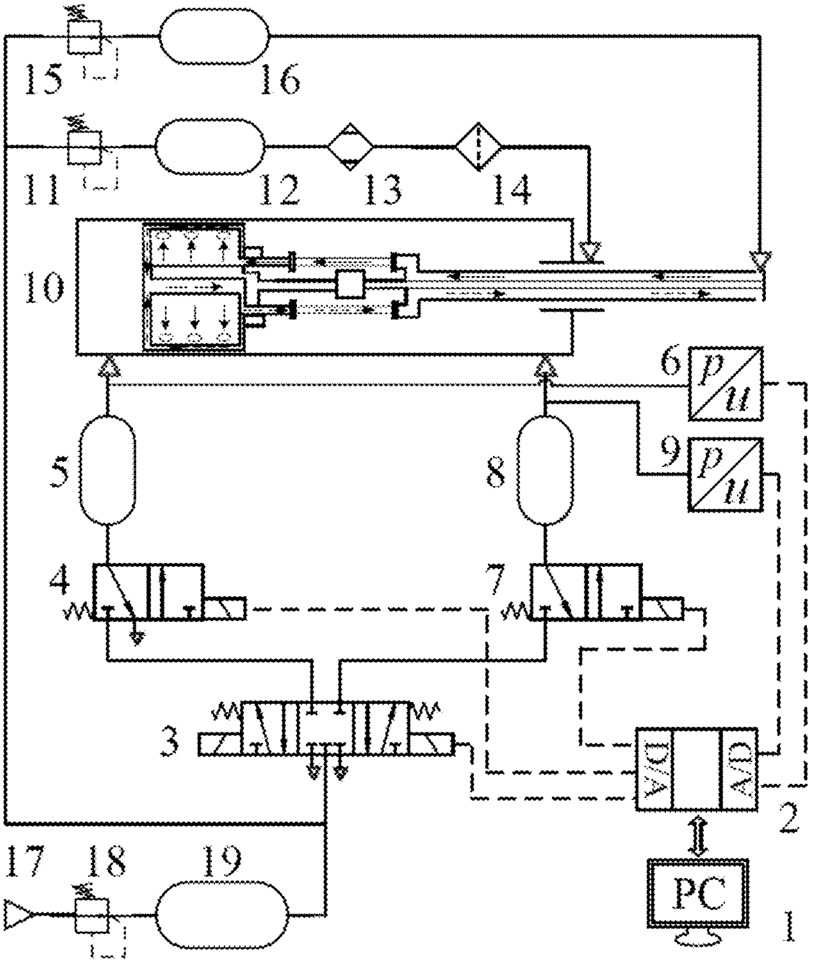
FIG. 1 is a schematic diagram of the pneumatic force servo system of the present invention.

With reference to FIG. 1, the ultra-high precision pneumatic force servo system of the present invention comprises an actuator module, a pressure control module, an air source module, and an air supply module; the actuator module is a general-purpose double-acting air-floating frictionless cylinder 10 disclosed in patent application No. 201711223571.1; the pressure control module comprises an industrial personal computer 1, a data acquisition card 2, a three-position five-way solenoid valve 3, a two-position three-way solenoid valve I 4, a two-position three-way solenoid valve II 7, a high-precision pressure sensor I 6, a high-precision pressure sensor II 9, a small air tank I 5, and a small air tank II 8; the air supply module comprises a pressure relief valve I 11, a pressure relief valve II 15, a small air tank III 12, a small air tank IV 16, an air dryer 13, and a precision filter 14; the air source module comprises an air source 17, a pressure relief valve III 18, and a large air tank 19.

The compressed air generated by the air source 17 is delivered to the large air tank 19 by means of the action of the pressure relief valve III 18, so as to provide compressed air for each pneumatic branch; the pressure relief valve I 11, the small air tank III 12, the air dryer 13, and the precision filter 14 constitute a branch I for supplying air to an air bearing of the air-floating frictionless cylinder 10, and the pressure relief valve II 15 and the small air tank IV 16 constitute a branch II for supplying air to an air-floating piston of the air-floating frictionless cylinder 10, thereby causing the air-floating frictionless cylinder 10 to work normally.

The upstream end of the three-position five-way solenoid valve 3 is connected to the large air tank 19 as a branch III; two ports of the three-position five-way solenoid valve 3 are connected to the small air tank I 5 and the small air tank II 8, respectively, by means of the two-position three-way solenoid valve I 4 and the two-position three-way solenoid valve II 7; the maximum valve port opening of the two-position three-way solenoid valve I 4 and the two-position three-way solenoid valve II 7 should be larger than or equal to the maximum valve port opening of the three-position five-way solenoid valve 3, for the purpose of not affecting an intake air flow. The small air tank I 5 and a rodless chamber of the air-floating frictionless cylinder 10 form a controlled chamber I, and the small air tank II 8 and a rod chamber of the air-floating frictionless cylinder 10 form a controlled chamber II; the inner diameters of all air pipes between the three-position five-way solenoid valve 3 and the chamber of the air-floating frictionless cylinder 10 should be greater than the nominal diameters of the two-position three-way solenoid valve I 4, the two-position three-way solenoid valve II 7, and the three-position five-way solenoid valve 3, and the aspect ratio of all the air pipes should be as small as possible to reduce the frictional pressure loss. The high-precision pressure sensor I 6 and the high-precision pressure sensor II 9 feedback pressure information of the chamber I and pressure information of the chamber II, respectively, to the industrial personal computer 1 by means of the data acquisition card 2, and the industrial personal computer 1 executes respective fuzzy PI control algorithms and then outputs voltage signals to the three-position five-way solenoid valve 3 by means of the data acquisition card 2.

Figure 2:
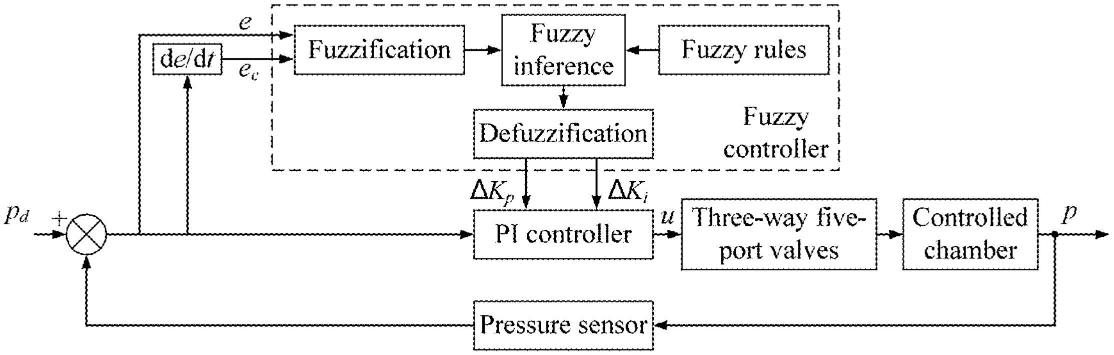
FIG. 2 is a schematic diagram of the fuzzy PI pressure controller of the present invention.

The fuzzy PI pressure control parameters are optimized by a novel improved particle swarm algorithm, and the steps are as follows:

S1: with reference to FIG. 2, a fuzzy PI pressure controller is built, and variables to be optimized are determined, specifically comprising:

S11: pressure error e and pressure error change rate $e_c$ are taken as input variables, increments $\Delta K_p$ and $\Delta K_i$ of PI controller parameters are taken as output variables, the domains of the variables are all set to be [−3, 3], and the fuzzy sets are all set to be {NB, NM, NS, ZE, PS, PM, PB};

S12: variables e and $e_c$ are multiplied by quantization factors $Q_e$ and $Q_{ec}$, respectively, and then are inputted to a fuzzy system, and a triangular membership function is used to achieve fuzzification;

S13: with reference to table 1 and table 2, a fuzzy inference rule base is established, and fuzzy inference is performed using a Mamdani method;

TABLE 1

Fuzzy rules of output variable $\Delta K_p$

| | $e_c$ | | | | | | |
|---|---|---|---|---|---|---|---|
| e | NB | NM | NS | ZE | PS | PM | PB |
| NB | PB | PB | PB | PB | PB | PM | PS |
| NM | PB | PB | PB | PM | PM | PS | ZE |
| NS | PM | PM | PM | PS | ZE | ZE | NS |
| ZE | PM | PM | PS | ZE | NS | NS | NM |
| PS | PS | PM | ZE | NS | NS | NM | NM |
| PM | ZE | NS | NS | NM | NM | NM | NB |
| PB | NS | NM | NM | NB | NB | NB | NB |

TABLE 2

Fuzzy rules of output variable $\Delta K_i$

| | $e_c$ | | | | | | |
|---|---|---|---|---|---|---|---|
| e | NB | NM | NS | ZE | PS | PM | PB |
| NB | NB | NB | NM | NM | NS | ZE | ZE |
| NM | NB | NB | NM | NS | NS | ZE | ZE |
| NS | NB | NM | NS | NS | ZE | PS | PS |
| ZE | NM | NM | NS | ZE | PS | PM | PM |
| PS | NM | NM | ZE | PS | PS | PM | PM |
| PM | ZE | ZE | PS | PS | PM | PB | PB |
| PB | ZE | ZE | PS | PM | PM | PB | PB |

S14: defuzzification is performed using a centroid method, and the defuzzified results are multiplied by proportion factors $P_{Kp}$ and $P_{Ki}$, and then $\Delta K_p$ and $\Delta K_i$ are outputted;

S15: parameters $K_p$ and $K_i$ are updated according to formula (1), so as to achieve tuning of the PI controller parameters;

$$\begin{cases} K_p = K_{p0} + \Delta K_p \\ K_i = K_{i0} + \Delta K_i \end{cases} \tag{1}$$

where: $\Delta K_{p0}$ and $\Delta K_{i0}$ are initial values of $K_p$ and $K_i$, respectively;

S16: $K_{p0}$, $K_{i0}$, $Q_{ec}$, $P_{kp}$, and $P_{Ki}$ in the fuzzy PI controller are determined to be variables to be optimized.

S2: Search space of the variables to be optimized is determined by means of a trial-and-error method.

S3: An objective function is determined in an optimization process; in a system step response rising stage (set to be the first $T_1$ seconds), an ITAE evaluation index function is used; and when the system enters a steady-state stage (set to be $T_1$ to $T_2$ seconds), an ITSE evaluation index function is used; the specific expression is:

$$f=\begin{cases}\int_0^{T_1} T|e(t)|dt & 0\le T\le T_1\\ \int_{T_1}^{T_2} Te^2(t)dt & T_1<T\le T_2\end{cases} \quad (2)$$

In addition, a penalty function is integrated into the objective function; when a certain particle does not complete a system step response rising stage in $T_1$ seconds, the present control is stopped and the particle is sentenced to "death", i.e. an extremely poor fitness value is given to the particle; when the input voltage of the three-position five-way solenoid valve reaches 0V or 10V three times, it is determined that the system oscillates at this time, the present control is stopped and the particle is sentenced to "death".

Figure 3:
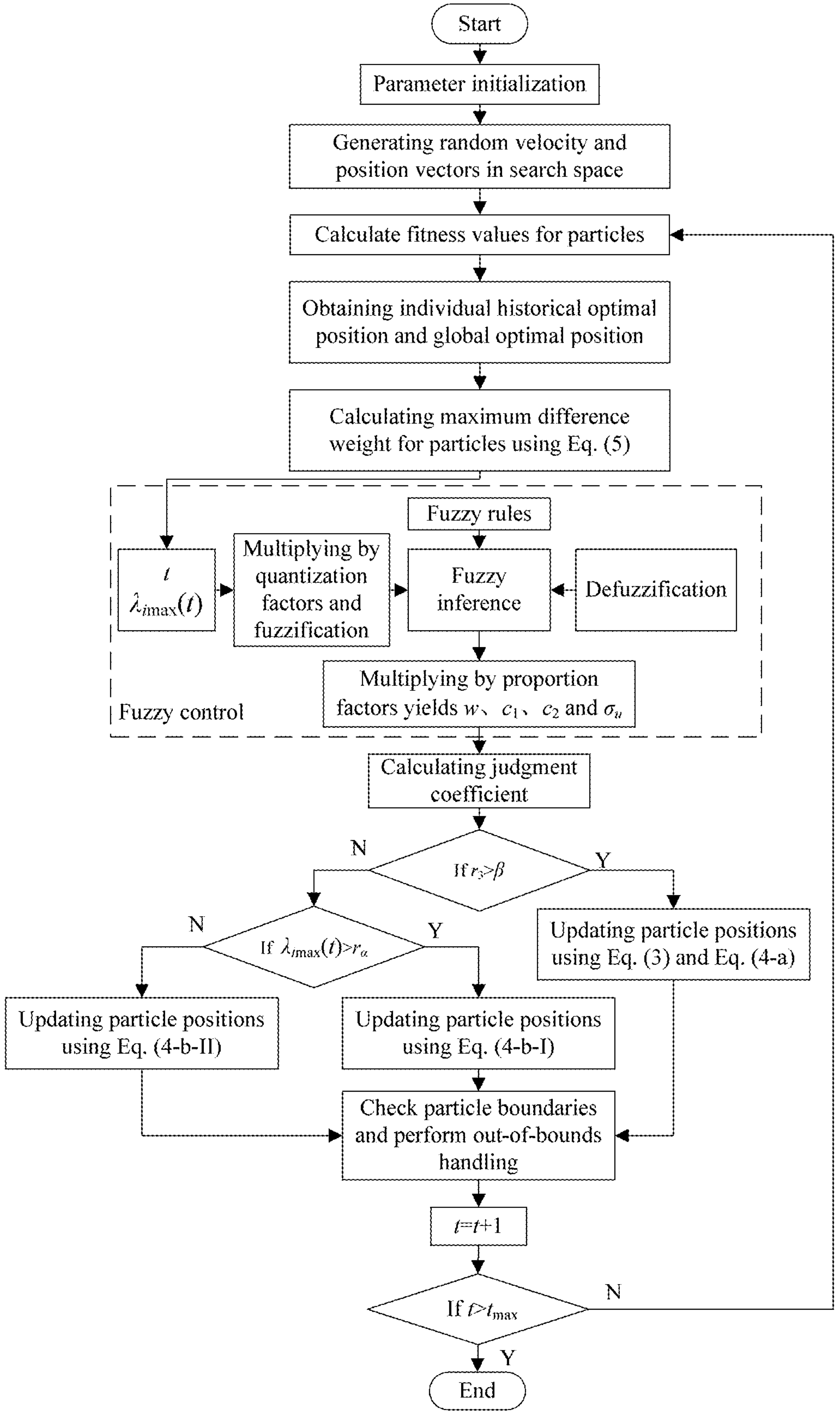
FIG. 3 is an optimization flowchart of the novel improved particle swarm algorithm of the present invention.

S4: with reference to FIG. 3, the novel improved particle swarm algorithm is used to perform iterative optimization, specifically comprising:

S41: basic parameters of the novel improved particle swarm optimization algorithm are set and initialized;

S42: particle position and velocity vectors are randomly initialized in the search space; S43: a fitness value of each particle is calculated;

S44: the fitness values are compared to obtain individual history optimal particle positions and a global optimal particle position; and S45: particles are updated using a velocity update formula (3) and a novel position update formula (4);

$$\vec{V}_i(t+1)=w\vec{V}_i(t)+c_1r_1\left(\vec{X}_{pbi}(t)-\vec{X}_i(t)\right)+c_2r_2\left(\vec{X}_{gb}(t)-\vec{X}_i(t)\right) \quad (3)$$

$$\vec{X}_i(t+1)=\begin{cases}\vec{X}_i(t)+\vec{V}_i(t+1), & r_3>\beta\ (a)\\ \vec{X}_i(t)+u\left(\vec{X}_{gb}(t)-\vec{X}_i(t)\right), & \lambda_{imax}(t)>r_\alpha\ (I)\\ v\vec{X}_i(t), & \lambda_{imax}(t)\le r_\alpha\ (II)\end{cases}\ \ r_3\le\beta\ (b) \quad (4)$$

where: $\vec{X}_i(t)$ is the position of an i-th particle after t iterations; $\vec{X}_{pbi}(t)$ is the individual history optimal position of the i-th particle after t iterations; $\vec{X}_{gb}(t)$ is the global optimal position of the whole swarm after t iterations; $\vec{V}_i(t)$ is the velocity of the i-th particle after t iterations; $\vec{V}_i(t+1)$ is the velocity of the i-th particle after (t+1) iterations; w is an inertia weight; $c_1$ and $c_2$ are a personal learning factor and a social learning factor, respectively; $r_1$, $r_2$, $r_3$, and $r_\alpha$ are random numbers within the range of [0, 1]; β is a coefficient of determination, and is determined by the standard deviation of the individual history optimal fitness values, and when the standard deviation is greater than 1, the value of β is 0.1; otherwise, the value of β is 0.5; v and u are random numbers conforming to Gaussian distribution; $\lambda_{imax}(t)$ is the weight of the maximum difference between $\vec{X}_i(t)$ and $\underline{X}_{gb}(t)$ in all dimensions. In formula (4), coefficient β set according to the individual optimal positions is to increase the probability of using the proposed novel position upgrade formula in a later period of iteration. Further, when the maximum difference weight of the particles is less than $r_\alpha$, it is considered that these particles are very close to the global optimal position, and thus introducing random number v conforming to Gaussian distribution can effectively avoid the particles falling into the local optima. In addition, even if the novel position update formula is used in an early period of iteration, the design of u also can ensure a stronger exploration capability of the algorithm. The specific expression of $\lambda_{imax}(t)$ is as follows:

$$\begin{cases}\lambda_{ik}(t)=\left|\dfrac{x_{ik}(t)-x_{gbk}(t)}{x_{gbk}(t)}\right|\\ \lambda_{imax}(t)=\max\{\lambda_{i1}(t),\lambda_{i2}(t),\ \dots\ ,\lambda_{ik}(t),\ \dots\ ,\lambda_{in}(t)\}\end{cases} \quad (5)$$

where: $x_{ik}(t)$ is the k-th dimension position value of the i-th particle at the t-th iteration; $x_{gbk}(t)$ is the k-th dimension value of the global optimal position at the t-th iteration; $\lambda_{ik}(t)$ is the k-th dimensional difference weight of the i-th particle at the t-th iteration.

The formula of random numbers u and v conforming to Gaussian distribution introduced in the improved particle swarm update formula is:

$$\begin{cases}u\sim N(1,\sigma_u^2)\\ v\sim N(r_4,\sigma_v^2),\ \sigma_v=r_5\end{cases}$$

where: $r_4$ is a random number in the range of [−1.5, 1.5]; and $r_5$ is a random number in the range of [0, 1].

In order to realize self-adaptive tuning of parameters w, $c_1$, $c_2$, and $\sigma_u$, the fuzzy theory is integrated into the novel improved particle swarm optimization algorithm, specifically comprising:

S451: the number of iterations t and the maximum difference weight $\lambda_{imax}(t)$ are taken as input variables, parameter increments Δw, $\Delta c_1$, $\Delta c_2$, and $\Delta\sigma_u$ are taken as output variables, the domains of the variables are all set to be [−3, 3], and the fuzzy sets are all set to be {NB, NM, NS, ZE, PS, PM, PB};

S452: variables t and $\lambda_{imax}(t)$ are multiplied by quantization factors $Q_t$ and $Q_\lambda$, respectively, and then are inputted to a fuzzy system, and a triangle membership function is used to achieve fuzzification;

S453: with reference to table 3 to table 6, a fuzzy inference rule base is established, and fuzzy inference is performed;

TABLE 3

Fuzzy rules of output variable Δw

| | $\lambda_{imax}(t)$ | | | | | | |
|---|---|---|---|---|---|---|---|
| t | NB | NM | NS | ZE | PS | PM | PB |
| NB | PB | PB | PM | PM | PS | PS | ZE |
| NM | PB | PB | PM | PM | PS | ZE | NS |
| NS | PM | PM | PM | PS | ZE | NS | NS |
| ZE | PM | PS | PS | ZE | NS | NS | NM |
| PS | PS | PS | ZE | NS | NS | NM | NM |
| PM | ZO | ZE | NS | NM | NM | NM | NM |
| PB | ZE | NS | NS | NM | NM | NM | NB |

TABLE 4

Fuzzy rules of output variable $\Delta c_1$

| | $\lambda_{imax}(t)$ | | | | | | |
|---|---|---|---|---|---|---|---|
| t | NB | NM | NS | ZE | PS | PM | PB |
| NB | PB | PB | PM | PM | PS | PS | ZE |
| NM | PB | PM | PM | PM | PS | ZE | NS |

TABLE 4-continued

Fuzzy rules of output variable $\Delta c_1$

| | $\lambda_{imax}(t)$ | | | | | | |
|---|---|---|---|---|---|---|---|
| t | NB | NM | NS | ZE | PS | PM | PB |
| NS | PM | PM | PM | PS | ZE | NS | NS |
| ZE | PM | PS | ZE | ZE | NS | NS | NM |
| PS | ZE | ZE | NS | NS | NS | NM | NM |
| PM | NS | NM | NM | NM | NM | NM | NM |
| PB | NB | NB | NB | NB | NB | NB | NB |

TABLE 5

Fuzzy rules of output variable $\Delta c_2$

| t | NB | NM | NS | ZE | PS | PM | PB |
|---|---|---|---|---|---|---|---|
| NB | NB | NB | NM | NM | NS | ZE | ZE |
| NM | NB | NM | NM | NM | NS | ZE | PS |
| NS | NM | NM | NM | NS | ZE | PS | PS |
| ZE | NM | NS | ZE | ZE | PS | PS | PM |
| PS | ZE | ZE | PS | PS | PS | PM | PM |
| PM | PS | ZE | PS | PM | PM | PM | PM |
| PB | PB | PB | PB | PB | PB | PB | PB |

TABLE 6

Fuzzy rules of output variable $\Delta\sigma_u$

| | $\lambda_{imax}(t)$ | | | | | | |
|---|---|---|---|---|---|---|---|
| t | NB | NM | NS | ZE | PS | PM | PB |
| NB | PB | PB | PM | PM | PS | PS | ZE |
| NM | PB | PB | PM | PM | PS | ZE | NS |
| NS | PM | PM | PM | PS | ZE | NS | NS |
| ZE | PM | PS | PS | ZE | NS | NS | NM |
| PS | PS | NS | ZE | NS | NS | NM | NM |
| PM | ZE | ZE | NS | NM | NM | NM | NM |
| PB | ZE | NS | NS | NM | NM | NM | NB |

S454: defuzzification is performed using a centroid method, and then the defuzzified results are multiplied by proportion factors $P_w$, $P_{c1}$, $P_{c2}$, and $P_{\sigma u}$, and then $\Delta w$, $\Delta_{c1}$, $\Delta_{c2}$, and $\Delta\sigma_u$ are outputted;

S455: parameters w, $c_1$, $c_2$, and $\sigma_u$ are updated according to formula (7), so as to achieve tuning of parameters of the novel improved particle swarm algorithm;

$$\begin{cases} w = w_0 + \Delta w \\ c_1 = c_{10} + \Delta c_1 \\ c_2 = c_{20} + \Delta c_2 \\ \sigma_u = \sigma_{u0} + \Delta\sigma_u \end{cases} \quad (7)$$

where $w_0$, $c_{10}$, $c_{20}$, and $\sigma_{u0}$ are initial values of the parameters.

Specifically, quantization factors $Q_t$ and $Q_\lambda$ and proportion factors $P_w$, $P_{c1}$, $P_{c2}$, and $P_{\sigma u}$ are set to be $6/t_{max}$, 6*rand (where rand is a random number within the range of [0,1]), (1/6)*rand, 1/3, 1/3, and 1/(6*rand) respectively, and initial values $w_0$, $c_{10}$, and $c_{20}$ are set to be 0.3, 0.5, and 0.5 respectively; if $t/t_{max}$<rand, the value of $\sigma_{u0}$ is $\cos(\pi t/t_{max})$ (where $t_{max}$ is the maximum number of iterations); and if $t/t_{max} \geq$ rand, the value of $\sigma_{u0}$ is 1E-15; introducing random numbers into the control parameters of the fuzzy controller is to improve the diversity of particle movement during optimization. In the first half stage of optimization, initial value $\sigma_{u0}$ is set to be a function decreasing with the number of iterations, for the purpose of causing the algorithm to have a stronger exploration capability, and to have a higher tolerance for a particle far from the global optimum; in the second half stage of optimization, initial value $\sigma_{u0}$ is set to be a very small value, for the purpose of causing the algorithm to have a stronger exploitation capability.

For the proposed novel improved particle swarm algorithm, the algorithms in documents "Comparing inertia weights and constriction factors in particle swarm optimization" (PSO-LDIW), "Self-organizing hierarchical particle swarm optimizer with time-varying acceleration coefficients" (HPSO-TVAC), "Tracking and optimizing dynamic systems with particle swarms" (PSO-RIW), "A particle swarm optimization algorithm with random learning mechanism and Levy flight for optimization of atomic clusters" (RPSOLF), and "HEPSO: high exploration particle swarm optimization" (HEPSO) are selected for comparison and verification regarding the following two functions.

Multi-dimensional unimodal function:

$$f(x) = \sum_{i=1}^{n}\left(\sum_{j=1}^{i} x_j\right)^2,$$

the variable range is [−100, 100], the maximum number of iterations of each algorithm is set to be 2500, the population size of each algorithm is set to be 50, and the population dimension is set to be 30. Each optimization algorithm is independently operated 30 times, and the average value, the standard deviation, the optimal solution, and the worst solution of the results of the 30 times of optimization are recorded.

Figure 4:
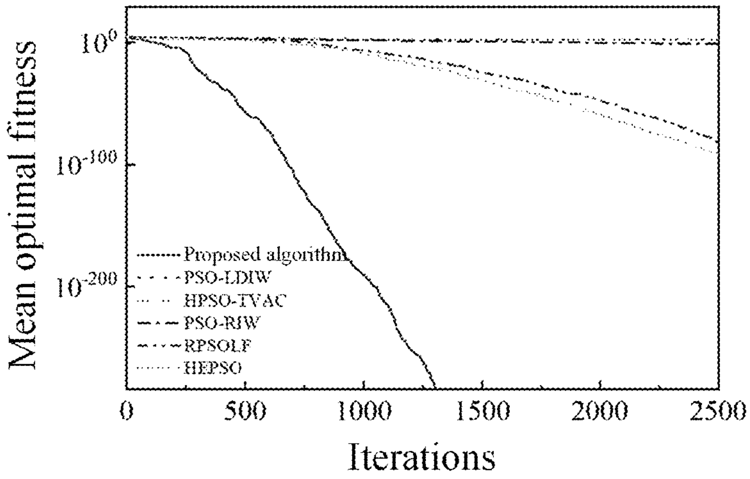
FIG. 4 is a converging curve graph of optimization of a multi-dimensional unimodal function according to embodiment I of the present invention.

With reference to table 7 and FIG. 4 for the optimization results of the algorithms, it can be determined that the proposed novel improved particle swarm algorithm found the optimal solution 0 of the function, while the other algorithms did not find 0, and the novel improved particle swarm algorithm has a fast convergence speed.

TABLE 7

Results of optimization of the multi-dimensional unimodal function

| Index | Novel algorithm | PSO-LDIW | HPSO-TVAC | PSO-RIW | RPSOLF | HEPSO |
|---|---|---|---|---|---|---|
| Average value | 0 | 3.3530E+02 | 1.6753E+02 | 5.2605E−02 | 5.0180E−82 | 5.1820E−93 |
| Standard deviation | 0 | 1.2690E+03 | 9.1274E+02 | 3.2518E−02 | 2.4515E−81 | 2.7244E−92 |

TABLE 7-continued

| Results of optimization of the multi-dimensional unimodal function | | | | | | |
|---|---|---|---|---|---|---|
| Index | Novel algorithm | PSO-LDIW | HPSO-TVAC | PSO-RIW | RPSOLF | HEPSO |
| Best value | 0 | 1.4920E−01 | 2.5964E−04 | 9.1940E−03 | 6.4071E−101 | 5.5045E−109 |
| Worst value | 0 | 5.0074E+03 | 5.0001E+03 | 1.7501E−01 | 1.3394E−80 | 1.4935E−91 |

Multi-dimensional multimodal function:

$$f_8(x) = -\sum_{i=1}^{n}\left[x_i \sin\left(\sqrt{|x_i|}\right)\right],$$

the variable range is [−500, 500], the maximum number of iterations of each algorithm is set to be 2500, the population size of each algorithm is set to be 50, and the population dimension is set to be 30. Each optimization algorithm is independently operated 30 times, and the average value, the standard deviation, the optimal solution, and the worst solution of the results of the 30 times of optimization are recorded.

Figure 5:
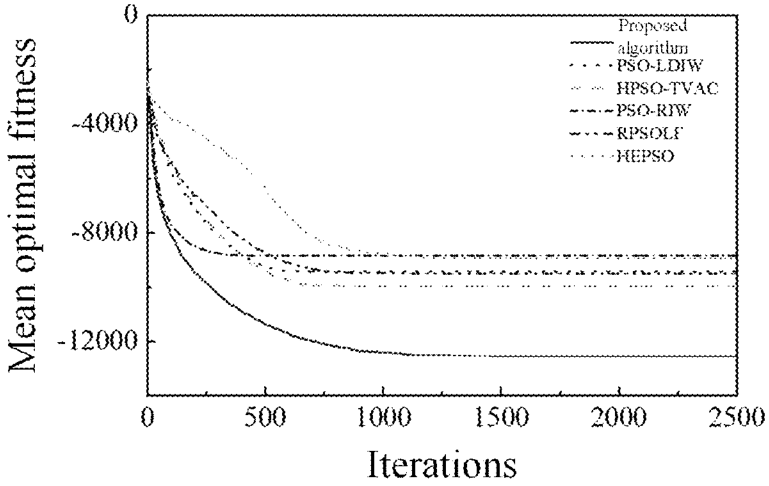
FIG. 5 is a converging curve graph of optimization of a multi-dimensional multimodal function according to embodiment I of the present invention.

With reference to table 8 and FIG. 5 for the optimization results of the algorithms, it can be determined that the proposed novel improved particle swarm algorithm still has the highest optimization accuracy and the fastest convergence speed compared with the other optimization algorithms.

TABLE 8

| Results of optimization of the multi-dimensional multimodal function | | | | | | |
|---|---|---|---|---|---|---|
| Index | Novel algorithm | PSO-LDIW | HPSO-TVAC | PSO-RIW | RPSOLF | HEPSO |
| Average value | −1.2569E+04 | −9.4151E+03 | −9.9498E+03 | −8.8326E+03 | −9.9495E+03 | −8.9425E+03 |
| Standard deviation | 6.1289E−04 | 5.6561E+02 | 6.6765E+02 | 7.0557E+02 | 5.5792E+02 | 7.1086E+02 |
| Best value | −1.2569E+04 | −1.1025E+04 | −1.0950E+04 | −1.0278E+04 | −1.0671E+04 | −1.0296E+04 |
| Worst value | −1.2569E+04 | −8.4699E+03 | −8.5881E+03 | −7.1392E+03 | −8.5394E+03 | −7.0222E+03 |

S46: Each particle is checked to determine whether there is a particle having gone beyond border, and if there is a particle having gone beyond border, the state of the particle before updating is retained;

S47: if the number of iterations reaches the maximum number of iterations, the next step is executed; otherwise, step S43 is executed; and

S48: operation is ended and optimized fuzzy PI control parameters are outputted.

S5: The chamber I and the chamber II are taken as controlled objects, and optimization is performed to obtain respective optimized fuzzy PI control parameters.

When the pneumatic force servo system is required to output an ultra-high precision pushing force, the industrial personal computer 1 controls, by means of the data acquisition card 2, the two-position three-way solenoid valve I 4 to switch to an open state, such that the three-position five-way solenoid valve 3 forms a passage with the chamber I, and at the same time, the two-position three-way solenoid valve II 7 is kept in a closed state, such that the chamber II is in communication with the atmosphere; then, a voltage control quantity is obtained by calculation using the built fuzzy PI controller of the chamber I system and chamber I control parameters obtained by optimization based on the novel improved particle swarm algorithm, and is outputted to the three-position five-way solenoid valve 3 by means of the data acquisition card 2 to execute ultra-high precision pressure control of the chamber I, such that ultra-high precision pneumatic pushing force output can be achieved.

When the pneumatic force servo system is required to output an ultra-high precision pulling force, the industrial personal computer 1 controls, by means of the data acquisition card 2, the two-position three-way solenoid valve II 7 to switch to an open state, such that the three-position five-way solenoid valve 3 forms a passage with the chamber II, and at the same time, the two-position three-way solenoid valve I 4 is in a closed state, such that the chamber I is in communication with the atmosphere; then, a voltage control quantity is obtained by calculation using the built fuzzy PI controller of the chamber II system and chamber II control parameters obtained by optimization based on the novel improved particle swarm algorithm, and is outputted to the three-position five-way solenoid valve 3 by means of the data acquisition card 2 to execute ultra-high precision pressure control of the chamber II, such that ultra-high precision pneumatic pulling force output can be achieved.

For this embodiment, parameter optimization will be verified using an experimental method.

In the experiment of this embodiment, the step response rising stage is 10 seconds, i.e. $T_1$ is 10 seconds; the step response steady stage is 20 seconds, i.e. $T_2$ is 30 seconds; a Keller PAA-33X pressure sensor is used as the pressure sensor, and a Festo MPYE-5-1/8LF-010 proportional directional valve is used as the three-position five-way solenoid valve.

Figure 6:
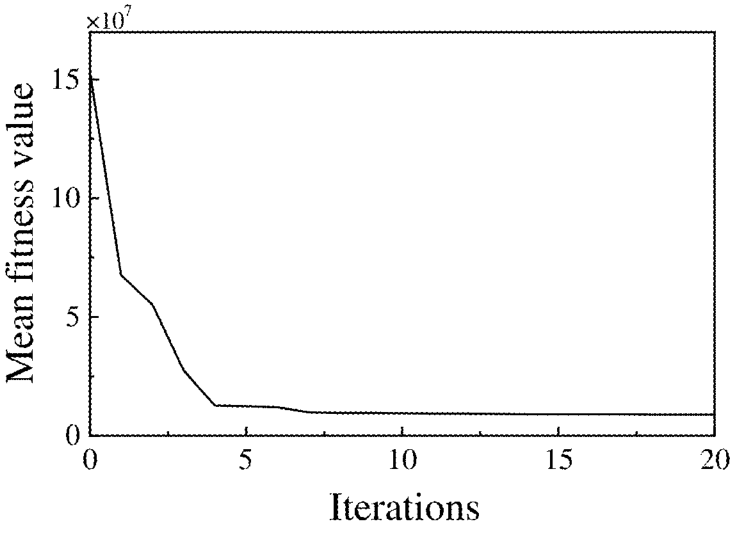
FIG. 6 is a converging curve graph of optimization of fuzzy PI pressure control in embodiment I of the present invention.

The number of particles and the number of iterations of the novel improved particle swarm optimization algorithm are set to be 20, and the value of quantization factor $Q_e$ mainly depends on a control system and is set to be 80000. The optimization results are shown in table 9 and FIG. 6. As can be determined from the figure, the proposed novel improved swarm optimization algorithm found the theoretical optimal control parameters of the fuzzy PI pressure controller at the ninth iteration. The obtained optimized parameters are rounded (or trimmed), and a pneumatic force servo experiment is carried out on the basis of this set of parameters.

TABLE 9

Parameters obtained by optimizing the fuzzy PI controller by the novel improved swarm optimization algorithm and parameters after rounding (or trimming)

| | $K_{p0}$ | $K_{i0}$ | $Q_e$ | $Q_{ec}$ | $P_{Kp}$ | $P_{Ki}$ |
|---|---|---|---|---|---|---|
| Optimized parameters | 91.628046 | 0.010464 | 80000 | 99.588592 | 6.217428 | 0.001084 |
| Rounded parameters | 92 | 0.0105 | 80000 | 100 | 6 | 0.0011 |

In the experiment, air having a pressure of 0.4 MPa and air having a pressure of 0.2 MPa are supplied to the air bearing and the air-floating piston of the air-floating frictionless cylinder by the air supply branch I and the air supply branch II, respectively. In addition, the pressure in the rodless chamber of the air-floating frictionless cylinder is multiplied by an effective working area of the rodless chamber to obtain the output pushing force of the cylinder (the effective area is 807.2665 $mm^2$ without considering a machining error). Continuous step pushing force control is performed on the pneumatic force servo system, and parameters obtained by optimization and rounding are used as the controller parameters, as shown in table 3.

Figure 7:
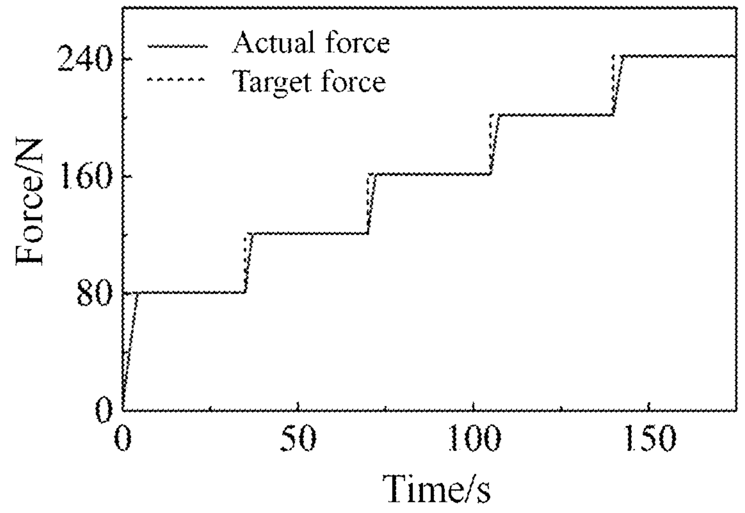
FIG. 7 is a continuous step pushing force response curve graph in embodiment I of the present invention.
Figure 8:
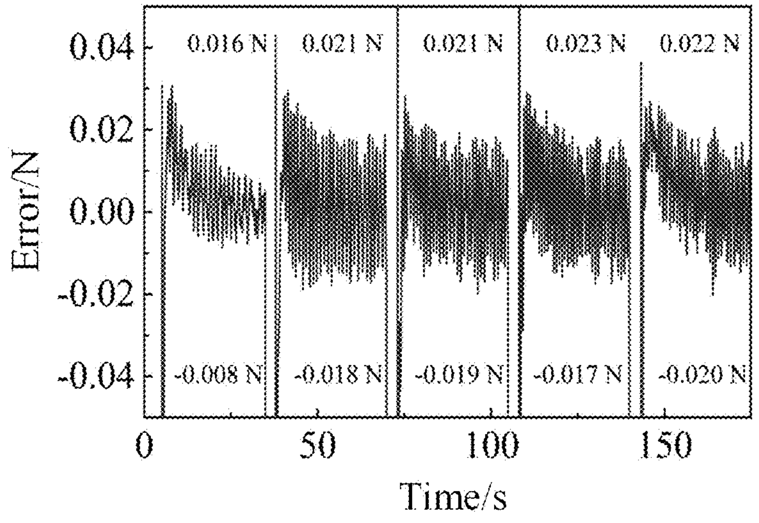
FIG. 8 is a continuous step pushing force error curve graph in embodiment I of the present invention.

With reference to FIG. 7 and FIG. 8, it can be determined that in this case, the actual continuous step output force response curve of the output force servo system is close to a target curve; and within an output force change range of 80N to 240N, the steady-state errors when the system reaches a stable state are all less than 0.023 N (equivalent to the system accuracy reaching 0.01% F.S., and thus the proposed pneumatic force servo system achieving an object of ultra-high precision). Thus, the method proposed in the present invention achieves an object of ultra-high precision control of the pushing force of an air-floating frictionless cylinder.

Embodiment II

The present embodiment differs from embodiment I in that the ultra-high precision pressure control of the chamber I and the ultra-high precision pressure control of the chamber II are alternately performed using the fuzzy PI control parameters of the chamber I system and the fuzzy PI control parameters of the chamber II system obtained by optimization based on the novel improved particle swarm algorithm, such that the alternating output of the ultra-high precision pushing force and the ultra-high precision pulling force of the air-floating frictionless cylinder can be achieved. The details are as follows: the industrial personal computer 1 first controls, by means of the data acquisition card 2, the two-position three-way solenoid valve I 4 to switch to an open state, such that the three-position five-way solenoid valve 3 forms a passage with the chamber I, and at the same time the industrial personal computer 1 controls the two-position three-way solenoid valve II 7 to switch to a closed state so as to quickly evacuate air from the chamber II; and the fuzzy PI controller of the chamber I system optimized on the basis of the novel improved particle swarm algorithm is used to control the three-position five-way solenoid valve 3 to supply air to the chamber I for a period of time; then, the industrial personal computer 1 controls, by means of the data acquisition card 2, the two-position three-way solenoid valve II 7 to switch to an open state, such that the three-position five-way solenoid valve 3 forms a passage with the chamber II, and the industrial personal computer 1 controls the two-position three-way solenoid valve I 4 to switch to a closed state so as to quickly evacuate air from the chamber I; and the fuzzy PI controller of the chamber II system optimized on the basis of the novel improved particle swarm algorithm is used to control the three-position five-way solenoid valve 3 to supply air to the chamber II for the same period of time. In this way, alternating output of a pushing force and a pulling force is performed for one period, and a continuous alternating force can be outputted by repeating the action of this period.

The invention claimed is:

1. A pneumatic force servo system, comprising an actuator module, a pressure control module, an air source module, and an air supply module; wherein the actuator module is a double-acting air-floating cylinder (10); the pressure control module comprises an industrial personal computer (1), a data acquisition card (2), a three-position five-way solenoid valve (3), a two-position three-way solenoid valve I (4), a two-position three-way solenoid valve II (7), a pressure sensor I (6), a pressure sensor II (9), a small air tank I (5), and a small air tank II (8); the air supply module comprises a pressure relief valve I (11), a pressure relief valve II (15), a small air tank III (12), a small air tank IV (16), an air dryer (13), and a filter (14); the air source module comprises an air source (17), a pressure relief valve III (18), and a large air tank (19);

the compressed air generated by the air source (17) is delivered to the large air tank (19) by means of the action of the pressure relief valve III (18), so as to provide compressed air for each pneumatic branch; the pressure relief valve I (11), the small air tank III (12), the air dryer (13), and the filter (14) constitute a branch I for supplying air to an air bearing of the air-floating cylinder (10), and the pressure relief valve II (15) and the small air tank IV (16) constitute a branch II for supplying air to an air-floating piston of the air-floating cylinder (10), thereby causing the air-floating cylinder to work normally;

the upstream end of the three-position five-way solenoid valve (3) is connected to the large air tank (19) as a branch III; two ports of the three-position five-way solenoid valve (3) are connected to the small air tank I (5) and the small air tank II (8), respectively, by means of the two-position three-way solenoid valve I (4) and the two-position three-way solenoid valve II (7); the small air tank I (5) and a rodless chamber of the air-floating cylinder (10) form a controlled chamber I, and the small air tank II (8) and a rod chamber of the air-floating cylinder (10) form a controlled chamber II; the pressure sensor I (6) and the pressure sensor II (9) feedback pressure information of the chamber I and pressure information of the chamber II, respectively, to the industrial personal computer (1) by means of the data acquisition card (2), and the industrial personal computer (1) executes respective fuzzy proportional-integral (PI) control algorithms and then outputs voltage signals to the three-position five-way solenoid valve (3) by means of the data acquisition card (2).

2. The servo system according to claim 1, wherein the maximum valve port opening of the two-position three-way solenoid valve I (4) and the two-position three-way solenoid valve II (7) is larger than or equal to the maximum valve port opening of the three-position five-way solenoid valve (3).

3. The servo system according to claim 1, wherein the inner diameters of all air pipes between the three-position five-way solenoid valve (3) and a chamber of the air-floating cylinder (10) are greater than the nominal diameters of the two-position three-way solenoid valve I (4), the two-position three-way solenoid valve II (7), and the three-position five-way solenoid valve (3).

4. An intelligent control parameter optimization method for a pneumatic force servo system according to claim 1, wherein the small air tank I (5) and the rodless chamber of the air-floating cylinder (10) form the controlled chamber I, and the small air tank II (8) and the rod chamber of the air-floating cylinder (10) form a controlled chamber II, and wherein control parameters of the fuzzy PI control algorithms are optimized by a novel improved particle swarm algorithm, and the steps are as follows:

S1: building a fuzzy PI pressure controller, and determining variables to be optimized;

S2: determining, by means of a trial-and-error method, search space of the variables to be optimized;

S3: determining an objective function in an optimization process;

S4: performing iterative optimization using the novel improved particle swarm algorithm; and S5: taking the chamber I and the chamber II as controlled objects, and performing optimization to obtain respective optimized fuzzy PI control parameters.

5. The method according to claim 4, wherein in step S3, the objective function is selected as follows: in a system step response rising stage, the stage being set to be the first $T_1$ seconds, an integral of time-weighted absolute error (ITAE) evaluation index function is used; when the system enters a steady state stage, the stage being set to be $T_1$ to $T_2$ seconds, an integral of time-weighted squared error (ITSE) evaluation index function is used; the specific expression is:

$$f=\begin{cases}\int_0^{T_1} t|e(t)|dt & 0\le t\le T_1\\ \int_{T_1}^{T_2} te^2(t)dt & T_1<t\le T_2\end{cases}$$

where: $f$ is an objective function; t is time; and e is a pressure control error.

6. The method according to claim 5, further comprising integrating a penalty function into the objective function, specifically as follows: when a certain particle does not complete a system step response rising stage in $T_1$ seconds, stopping the present control; when the input voltage of the three-position five-way solenoid valve reaches OV or 10V three times, determining that the system oscillates at this time, and stopping the present control.

7. The method according to claim 4, wherein the iterative optimization process in step S4 is as follows:

S41: setting basic parameters of the novel improved particle swarm optimization algorithm and initializing same;

S42: randomly initializing particle position and velocity vectors in the search space;

S43: calculating a fitness value of each particle;

S44: comparing the fitness values to obtain individual history optimal particle positions and a global optimal particle position;

S45: updating the particles using a velocity update formula and a novel position update formula;

S46: checking each particle to determine whether there is a particle having gone beyond border, and if there is a particle having gone beyond border, retaining the state of the particle before updating;

S47: if the number of iterations reaches the maximum number of iterations, executing the next step; otherwise, executing step S43; and S48: ending operation and outputting optimized fuzzy PI control parameters;

the velocity update formula and the novel position update formula in step S45 are as follows:

$$\vec{V}_i(t+1)=w\vec{V}_i(t)+c_1r_1\left(\vec{X}_{pbi}(t)-\vec{X}_i(t)\right)+c_2r_2\left(\vec{X}_{gb}(t)-\vec{X}_i(t)\right)$$

$$\vec{X}_i(t+1)=\begin{cases}\vec{X}_i(t)+\vec{V}_i(t+1), & r_3>\beta\ (a)\\ \left.\begin{array}{ll}\vec{X}_i(t)+u\left(\vec{X}_{gb}(t)-\vec{X}_i(t)\right), & \lambda_{imax}(t)>r_\alpha\ (I)\\ v\vec{X}_i(t), & \lambda_{imax}(t)\le r_\alpha\ (II)\end{array}\right\} & r_3\le\beta\ (b)\end{cases}$$

where: $\vec{X}_i(t)$ is the position of an i-th particle after t iterations; $\vec{X}_{pbi}(t)$ is the individual history optimal position of the i-th particle after t iterations; $\vec{X}_{gb}(t)$ is the global optimal position of the whole swarm after t iterations; $\vec{V}_i(t)$ is the velocity of the i-th particle after t iterations; $\vec{V}_i(t+1)$ is the velocity of the i-th particle after (t+1) iterations; w is an inertia weight; $c_1$ and $c_2$ are a personal learning factor and a social learning factor, respectively; $r_1$, $r_2$, $r_3$, and $r_\alpha$ are random numbers within the range of [0, 1]; β is a coefficient of determination, and is determined by the standard deviation of the individual history optimal fitness values, and when the standard deviation is greater than 1, the value of β is 0.1; otherwise, the value of β is 0.5; v and u are random numbers conforming to Gaussian distribution; $\lambda_{imax}(t)$ is the weight of the maximum difference between $\vec{X}_i(t)$ and $\vec{X}_{gb}(t)$ in all dimensions, and the specific expression is as follows:

$$\begin{cases}\lambda_{ik}(t)=\left|\dfrac{x_{ik}(t)-x_{gbk}(t)}{x_{gbk}(t)}\right|\\ \lambda_{imax}(t)=\max\{\lambda_{i1}(t),\lambda_{i2}(t),\ldots,\lambda_{ik}(t),\ldots,\lambda_{in}(t)\}\end{cases}$$

where: $x_{ik}(t)$ is the k-th dimension position value of the i-th particle at a t-th iteration; $x_{gbk}(t)$ is the k-th dimension value of the global optimal position at the t-th iteration; $\lambda_{ik}(t)$ is the k-th dimensional difference weight of the i-th particle at the t-th iteration;

the formula of random numbers u and v conforming to Gaussian distribution introduced in the improved particle swarm update formula is:

$$\begin{cases} u \sim N(1, \sigma_u^2) \\ v \sim N(r_4, \sigma_v^2), \sigma_v = r_5 \end{cases}$$

where: $r_4$ is a random number within the range of [−1.5, 1.5]; $r_5$ is a random number within the range of [0, 1]; $\sigma_u$ and $\sigma_v$ respectively are the variances of the Gaussian distributions that u and v conform to.

8. The method according to claim 7, wherein parameters w, $c_1$, $c_2$, and $\sigma_u$ in the novel position update formula are self-adaptive by means of a fuzzy control system, specifically as follows: the number of iterations t and the maximum difference weight $\lambda_{imax}(t)$ are taken to be input variables, multiplied by corresponding quantization factors $Q_t$ and $Q_\lambda$ and then inputted into a fuzzy system, and are fuzzified and then multiplied by proportion factors $P_w$, $P_{c1}$, $P_{c2}$, and $P_{\sigma u}$, and then increments $\Delta w$, $\Delta c_1$, $\Delta c_2$, and $\Delta\sigma_u$ are outputted, and parameters w, $c_1$, $c_2$, and $\sigma_u$ can be obtained by means of the following formula:

$$\begin{cases} w = w_0 + \Delta w \\ c_1 = c_{10} + \Delta c_1 \\ c_2 = c_{20} + \Delta c_2 \\ \sigma_u = \sigma_{u0} + \Delta\sigma_u \end{cases}$$

where $w_0$, $c_{10}$, $c_{20}$, and $\sigma_{u0}$ are initial values of the parameters;

the domains of variables t, $\lambda_{imax}(t)$, $\Delta w$, $\Delta c_1$, $\Delta c_2$, and $\Delta\sigma_u$ are all set to be [0, 6], and quantization factors $Q_t$ and $Q_\lambda$ and proportion factors $P_w$, $P_{c1}$, $P_{c2}$, and $P_{\sigma u}$ are set to be $6/t_{max}$, 6*rand, where rand is a random number within the range of [0,1], (1/6)*rand, 1/3, 1/3, and 1/(6*rand), respectively, and initial values $w_0$, $c_{10}$, and $c_{20}$ are set to be 0.3, 0.5, and 0.5, respectively; if $t/t_{max}$<rand, the value of $\sigma_{u0}$ is $\cos(\pi t/t_{max})$, where $t_{max}$ is the maximum number of iterations; and if $t/t_{max}$≥rand, the value of $\sigma_{u0}$ is 1E-15.

9. The method according to claim 1, wherein by performing pressure control of the chamber I using the fuzzy PI control parameters of the chamber I system obtained by optimization based on the novel improved particle swarm algorithm, pushing force output of the air-floating cylinder can be achieved; and by performing pressure control of the chamber II using the fuzzy PI control parameters of the chamber II system obtained by optimization based on the novel improved particle swarm algorithm, pulling force output of the air-floating cylinder can be achieved.

10. The method according to claim 1, wherein by performing pressure control of the chamber I and pressure control of the chamber II alternately using the fuzzy PI control parameters of the chamber I system and the fuzzy PI control parameters of the chamber II system obtained by optimization based on the novel improved particle swarm algorithm, alternating output of a pushing force and a pulling force of the air-floating cylinder can be achieved.

* * * * *